Figure 1:
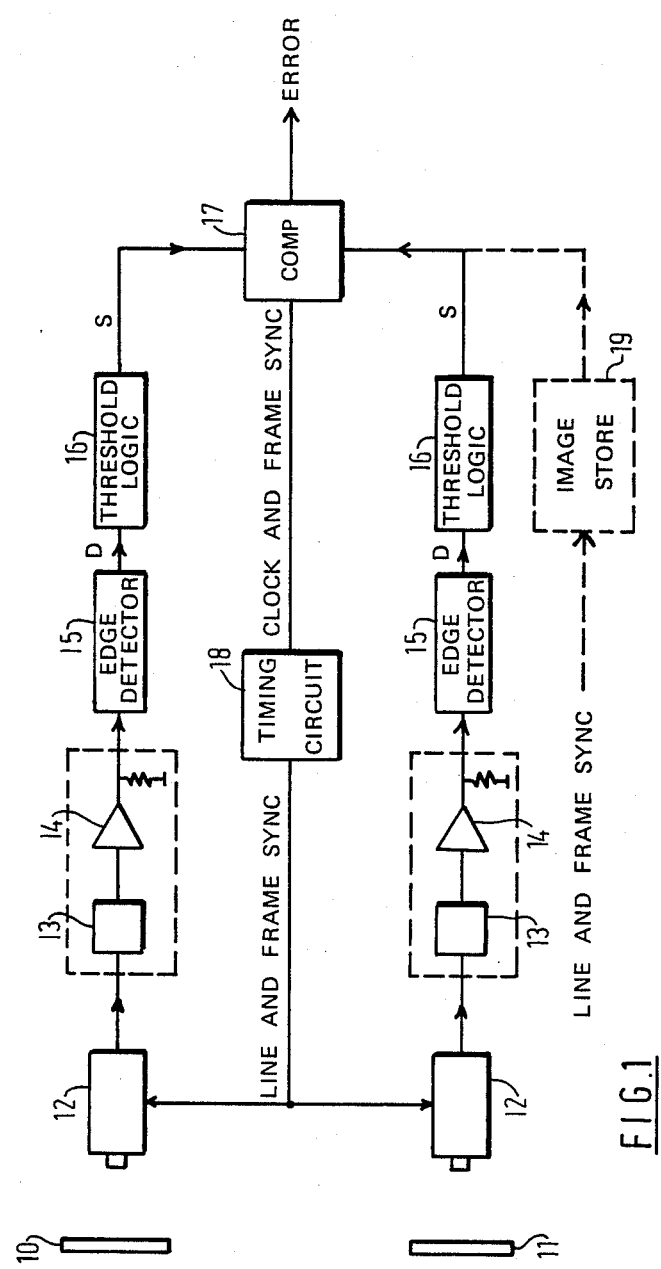

United States Patent [19]

Hopkins

[11] Patent Number: 4,942,463

[45] Date of Patent: Jul. 17, 1990

[54] IMAGE PROCESSING SYSTEM FOR DETECTING EDGES IN AN IMAGE OF AN ARTICLE

[75] Inventor: Brian M. Hopkins, Ennis, Ireland

[73] Assignee: Westinghouse Electric Corp., Pittsburgh, Pa.

[21] Appl. No.: 340,989

[22] Filed: Apr. 20, 1989

[30] Foreign Application Priority Data

Apr. 22, 1988 [IE] Ireland ................................ 1234/88

[51] Int. Cl.$^5$ ......................... H04N 7/00; H04N 7/18
[52] U.S. Cl. ..................................... 358/96; 358/101; 358/106; 358/107
[58] Field of Search ................. 358/106, 101, 107, 93, 358/494, 464, 96

[56] References Cited

U.S. PATENT DOCUMENTS

| | | | |
|---|---|---|---|
| 4,143,401 | 3/1979 | Coviello | 358/96 |
| 4,148,065 | 4/1979 | Nakagawa et al. | 358/101 |
| 4,389,669 | 6/1983 | Epstein et al. | 358/107 |
| 4,475,122 | 10/1984 | Green | 358/107 |
| 4,677,461 | 6/1987 | Mizutani et al. | 358/96 |
| 4,680,627 | 7/1987 | Sase et al. | 358/101 |
| 4,839,725 | 6/1989 | Ueda | 358/96 |

Primary Examiner—John K. Peng

[57] ABSTRACT

An image processing system comprises a television-type camera for line-by-line scanning an article to generate a video signal representing an image of the article. The video signal is applied to one end of an even number 2n of series-connected delay elements whose time delays are symmetrical relative to the mid-point of the series, and the amplitudes of the underlayed and successively delayed video signal are normalized so that all such amplitudes are equal when the video signal over the total delay period represents a constant intensity portion of the image. A signal D is formed representing the difference between n times the amplitude of the video signal at the mid-point of the series of delay elements and the sum of the amplitudes of the video signal at the input of the series of delay elements and at the output of each delay element except the delay element whose output is at the mid-point of the series. The signal D defines the positions, in the direction of line scanning, of edges between contrasting regions of the image.

10 Claims, 9 Drawing Sheets

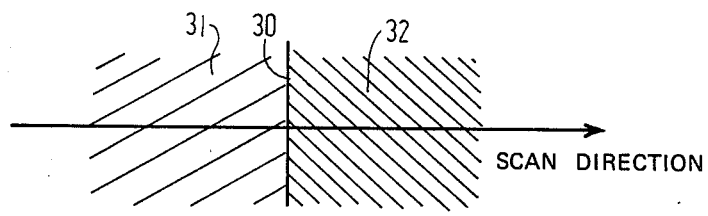
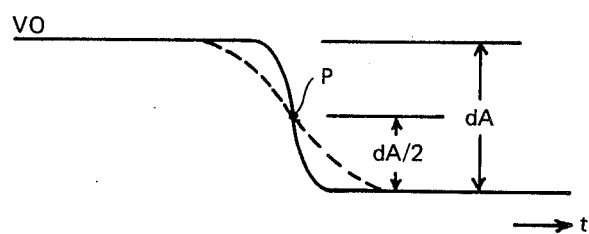
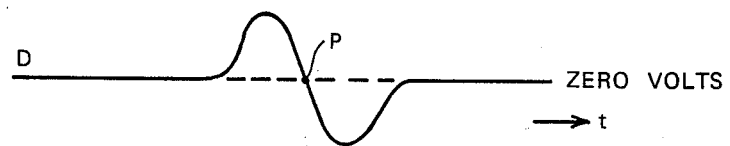
FIG.3

IMAGE PROCESSING SYSTEM FOR DETECTING EDGES IN AN IMAGE OF AN ARTICLE

This invention relates generally to an image processing system comprising means for line-by-line scanning an article to generate a video signal representing an image of the article.

The invention has particular, though not exclusive, utility in systems for inspecting articles of the kind where an image of an article under test is scanned line by line to generate a video signal, and desired features in the image are extracted from the video signal and compared with corresponding features of a master article, i.e. an article which is known to be acceptable by prior inspection, in order to determine whether the article under test is itself acceptable.

Such systems are well known, but generally do not operate in "real time", that is to say they first collect the image information and only when all such information is collected is it analysed in a separate step, usually by computer under software control.

This may be acceptable for scientific applications, but not for industrial applications (e.g. production line inspection) where an immediate good/bad decision is required.

Thus it is an object of the present invention to provide a new image processing technique useful inter alia for the inspection of articles and which can be effected in real time.

Accordingly, the present invention comprises an image processing system comprising means for line-by-line scanning an article to generate a video signal representing an image of the article, a plurality 2n of series-connected delay means where n is greater than or equal to one and the time delays of the delay means are substantially symmetrical relative to the mid-point of the series, an input for the video signal at one end of the series of delay means, means for normalising the amplitudes of the undelayed and successively delayed video signal whereby all such amplitudes are equal when the video signal over the total delay period represents a constant intensity portion of the image, and means for forming a signal D representing the difference between n times the amplitude of the video signal at the output of the nth delay means and the sum of the amplitudes of the video signal at the input of the series of delay means and at the output of each delay means except the nth delay means, such signal D defining the positions, in the direction of line scanning, of edges between contrasting regions of the image.

We have found that the use of delay lines in the above way provides a very accurate indication of the location of edges in the scanned image, and which is largely independent of contrast and focus of the image.

Preferably, the system further comprises threshold logic means for forming from the signal D a binary signal S in which at least one selected image feature, as defined by the positions of its opposite edges in the signal D, is represented by a first logic level and the portions of the image on either side of such feature are represented by a second logic level.

The threshold logic means may comprise means for comparing the binary signal D with a reference level, equal to the level of the signal D when the video signal over the total delay period represents a contrast intensity portion of the image, to generate a binary signal A having a first logic level when the signal D exceeds the reference level and a second logic level when the signal D does not exceed the reference level, means for comparing the amplitude of the video signal at the input of the series of delay means and the amplitudes of the video signal at the output of each delay means except the nth delay means each with a common threshold level to generate in each case a respective binary signal B having a first logic level when the video signal exceeds the threshold level and a second logic level when the video signal does not exceed the threshold level, and logic gating means effecting a logical combination of the binary signal A and the binary signals B to derive the binary signal S.

Further, the gating means may comprise a first gate for ORing the binary signals B, a second gate for ANDing the binary signals B, a third gate for ANDing the binary signal A with the output of the first gate, and a fourth gate for ORing the outputs of the second and third gates, the binary signal S appearing at the output of the fourth gate.

To take account of uneven illumination of the article, means may be provided to cause the threshold level to track the maximum amplitude of the undelayed and delayed video signal.

In the case of an inspection system for comparing the article as an article under test with a master article known to be acceptable, the system may further comprise comparison means for comparing each line of the signal S in synchronism with the corresponding line of a similar signal S derived from an image of the master article and for generating an error signal when a predetermined comparison criterion is not met.

The signal S representing the master article may be derived by line-by-line scanning the master article in synchronism with the article under test, or it may be read out from a store in which such signal has previously been stored.

Figure 2:
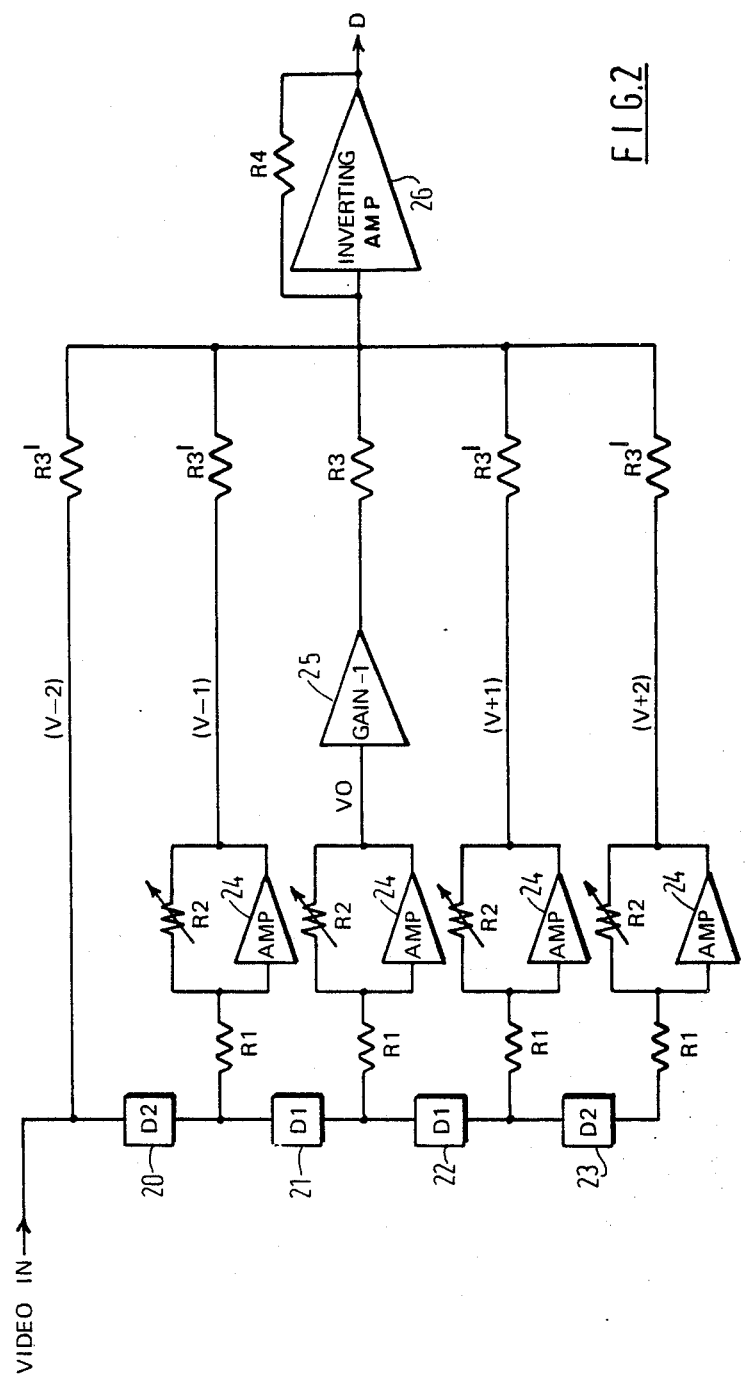
Figure 4:
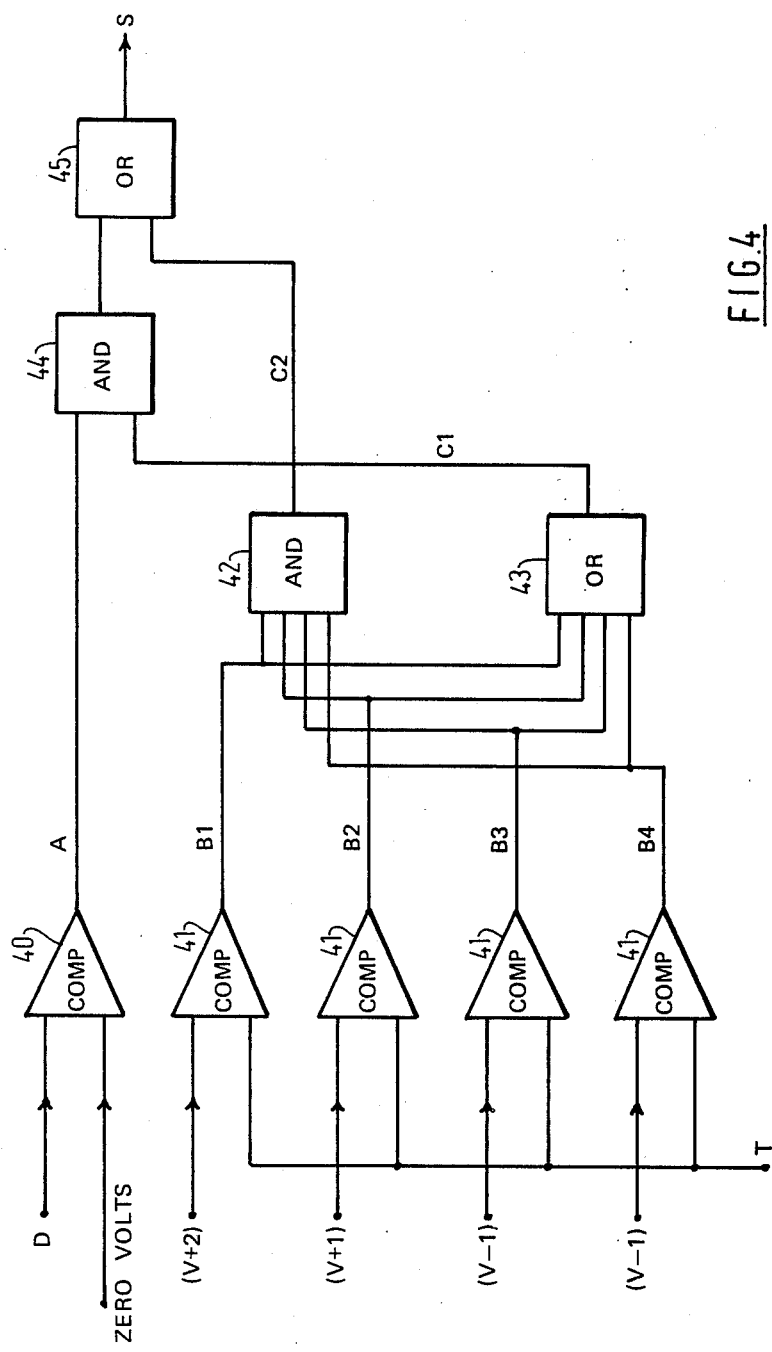
Figure 5:
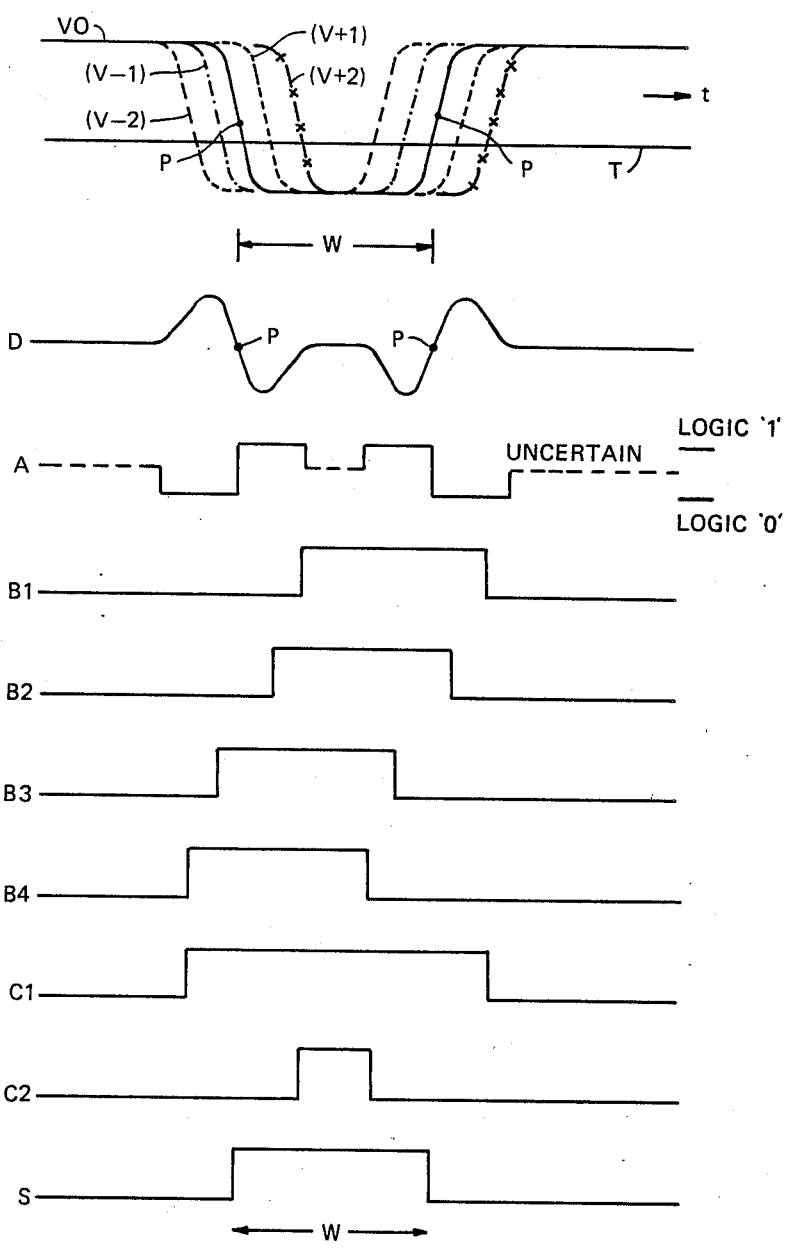
Figure 6:
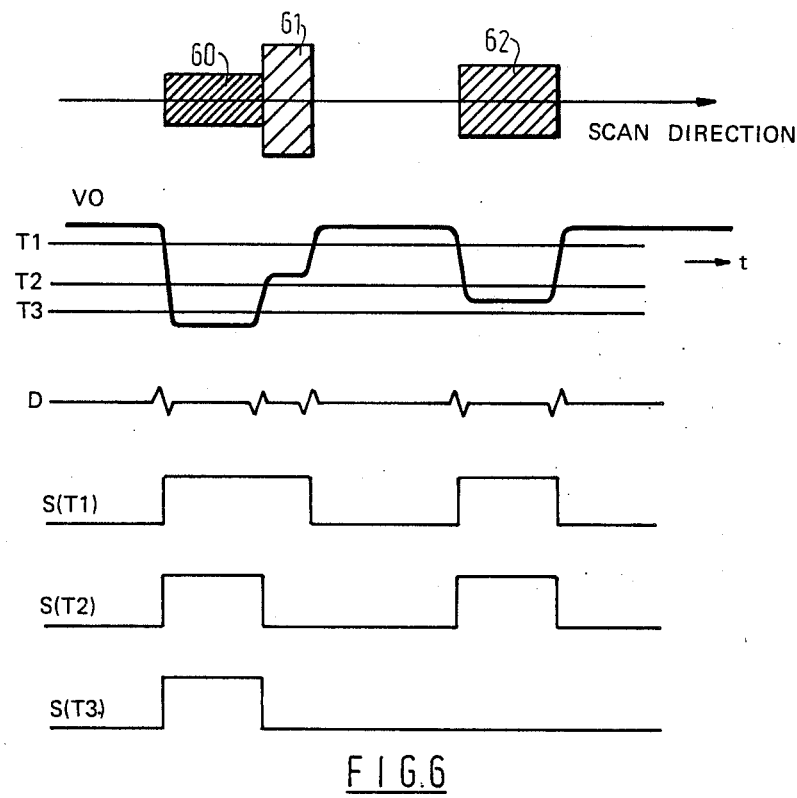
Figure 7:
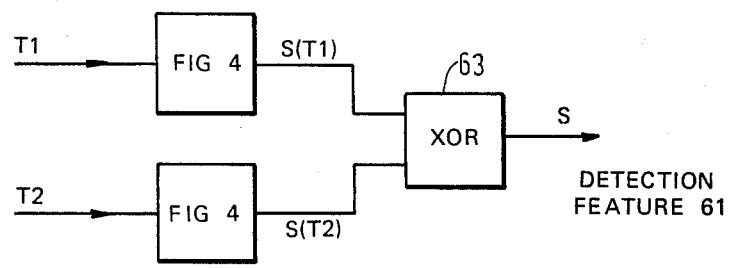
Figure 8:
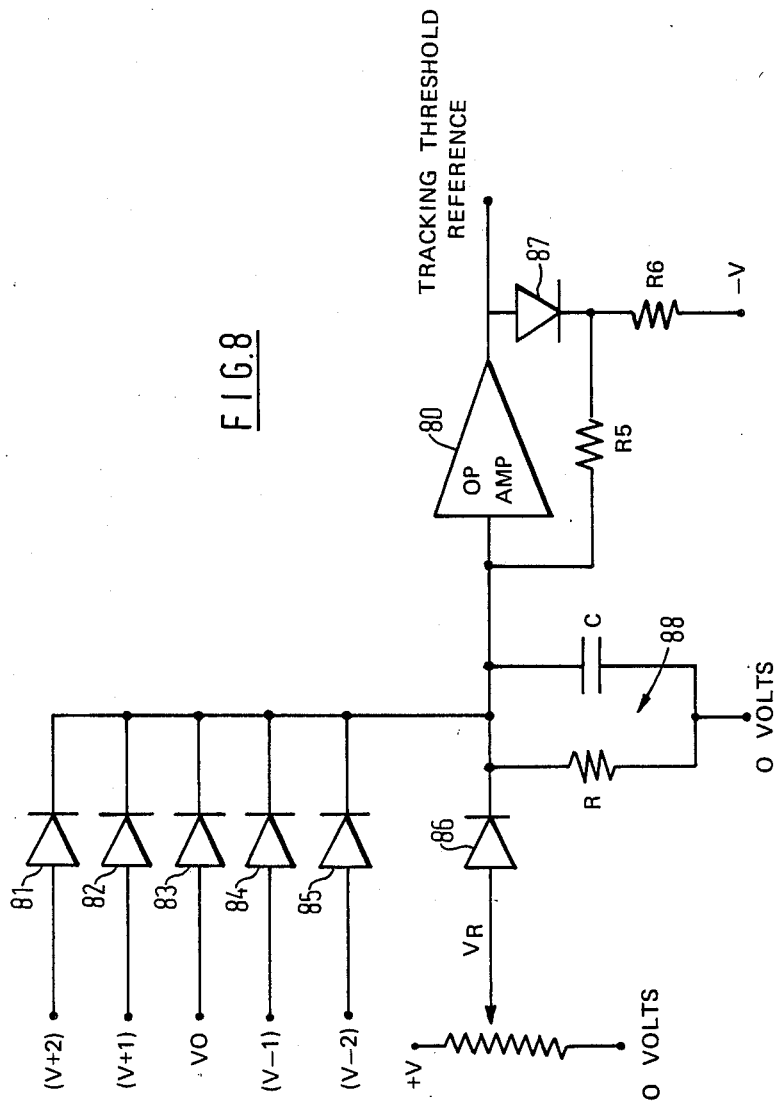
Figure 9:
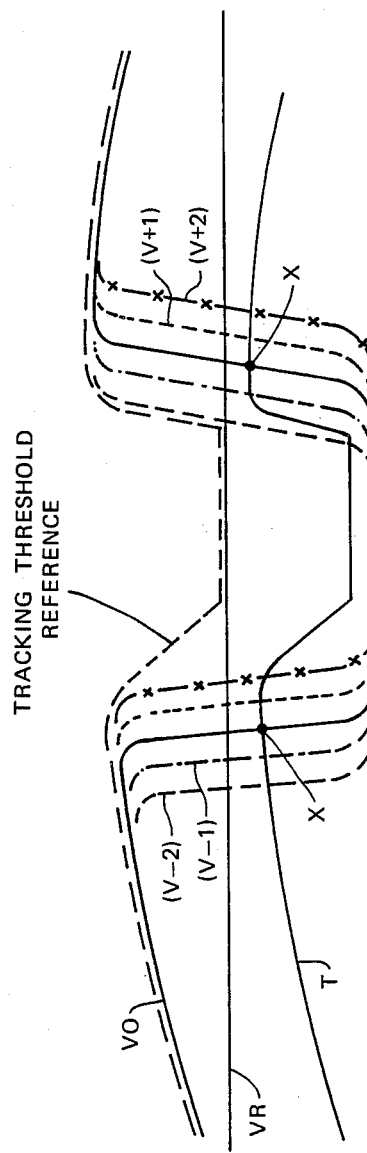
Figure 10:
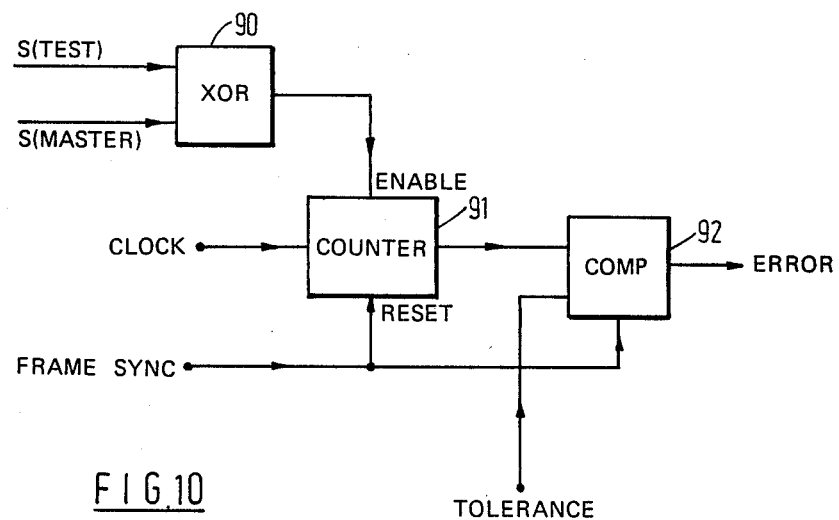
Figure 11:
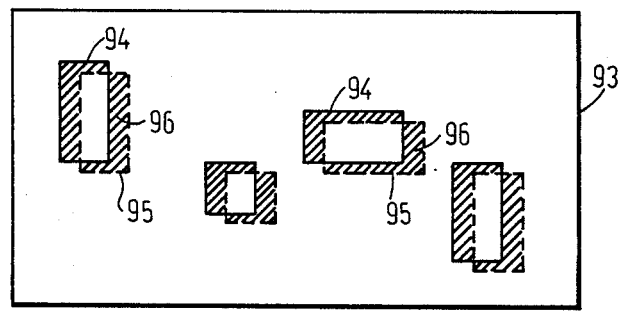

An embodiment of the invention will be described, by way of example, with reference to the accompanying drawings, wherein:

FIG. 1 is a general block diagram of an inspection system embodying the invention, FIG. 2 shows the edge detector circuit of FIG. 1, FIG. 3 shows signals illustrating the operation of the edge detector circuit of FIG. 2, FIG. 4 shows the threshold logic of FIG. 1, FIG. 5 shows signals ilustrating the operation of the threshold logic of FIG. 4, FIG. 6 shows signals ilustrating a more general case than that shown in FIG. 5, FIG. 7 shows how the outputs of two circuits such as that shown in FIG. 4 may be combined, FIG. 8 shows a threshold tracking circuit which may form part of the threshold logic, FIG. 9 illustrates the operation of the threshold tracking circuit of FIG. 8, FIG. 10 is a diagram illustrating one form of comparison circuit which may be used in the system of FIG. 1, and FIG. 11 is a simplified diagrammatic illustration of the effect of the comparison circuit of FIG. 10.

Referring first to FIG. 1, a system is shown for inspecting two articles 10 and 11, the article 10 being an article under test and the article 11 being a "master" article of the same type as the article 10 under test, but which is known to be acceptable by prior manual inspection. First a general overview of the system will be given, followed by a more detailed description.

In the system, each article 10 and 11 is scanned in line-by-line raster fashion by a respective television-type camera 12, and each monochrome video signal thus produced is passed to a respective video amplifier circuit comprising a pre-amplifier 13 and a buffer amplifier 14.

Next, each amplified video signal is passed to a respective edge detector 15, which provides a signal D accurately defining the location of edges, i.e. boundaries between regions of contrasting intensity, in the image represented by the corresponding video signal.

Resepective threshold logic 16 acts on each signal D and selects certain desired pairs of edges, corresponding to the opposite edges of particular features of interest in each image, to form a respective binary signal S in which each selected feature is represented by a first logic level and non-selected features by a second logic level.

Finally, each signal S passes to a common comparator 17 where they are compared according to any desired criterion. An error signal is generated if the criterion is not met, indicating an unacceptable degree of deviation of the article 10 under test from the master article 11.

Overall system timing is provided by a timing circuit 18 which ensures synchronised operation of the various parts of the system.

A more complete description of the construction and operation of the system will now be given with reference to the further figures of the drawings, but it will be understood that items 12 to 16 of the upper (test) channel are identical with the correspondingly referenced items of the lower (master) channel, so that these items will only be described once and the description may be taken to apply to both channels.

The cameras 12 are in this embodiment Hitachi KP120 cameras, operated at a line frequency of 16 kHz and having a vertical resolution of 380 lines per frame. The two cameras are maintained in strict synchronism by line and frame sync signals provided by the timing circuit 18. The latter is based upon a 16.4 MHz crystal oscillator, and all timing signals are derived from the oscillator output by dividers in conventional fashion.

In the present case the articles 10 and 11 are assumed to be printed circuit boards (PCBs), either bare boards or with components mounted upon them. As stated before, the board 11 is a master board, a so-called "golden board", which has been manually checked to determine that it is acceptable, and the board 10 is the test board which is to be compared against the golden board.

Each board is typically 12 inches by 10 inches, and is illuminated by means (not shown) which provide as even illumination as possible across the board, and the cameras are oriented "square on" facing their respective boards. Although each camera may view each board in its entirety, in general the field of view of each camera is adjusted according to the size of features to be detected. For example, each camera will typically have a field of view of 1 inch by ¾ inch for a PCB with surface mounted components, while for conventionally mounted components a field of view of 2 inches by 1 and a ½ inches might be more appropriate.

It is clear that for the ultimate comparison to be meaningful, the field of view of each camera 12 in relation to the respective board 10 or 11 must be identical at any one time. This is achieved in conventional manner by mounting the boards 10 and 11 on a common X-Y positioning table (not shown) which is movable in a plane normal to the optical axes of the cameras 12. The boards are mounted on the X-Y table at respective positions such that each camera is always viewing the same part of the board as the other. Then, by stepping the X-Y table, successive regions of each board may be inspected.

It is to be understood in that the invention is not limited to the use of television type cameras for effecting the line-by-line scanning. For example, a CCD array or other opto-electrical scanner could be used. These are well known in the art.

Also, the invention is not limited to the inspection of printed circuit boards, but has general applicability to the inspection of articles where desired features are sufficiently contrasted from their surroundings to be detected as described hereafter.

The remainder of the description will deal with the processing of the video signal derived from a single field of view of each camera, since the circuitry obviously remains the same for successive fields of view, and the only difference is that the comparator 17 will require to be reset prior to each new field of view.

After passing through the respective video amplifier circuit 13,14, each video signal passes to the edge detector circuit 15, FIG. 2, where it is fed to one end of four video delay lines 20 to 23 connected in series. The delays are so arranged that each of the inner two delay lines 21 and 22 have an equal time delay D1, and each of the outer two delay lines 20 and 23 have an equal time delay D2. In the present case D1=200 ns and D2=500 ns. However, as will be described hereafter, any even number 2n of delay lines can be used, where n is greater than or equal to one, and the delay times are not limited as above.

From the series of four delay lines five signals are obtained these being shown in FIG. 2 as $V-2$, $V-1$, $V0$, $V+1$ and $V+2$, all of which are displaced in time from each other by an amount equal to the appropriate delays. These five signals can be combined, as will be described, to provide a signal which accurately defines the positions of edges, i.e. boundaries between regions of contrasting intensity, in the image represented by the video signal. First, however, the amplitudes of the five signals must be matched (normalised) to compensate for the inherent decrease in amplitude caused by each delay line.

Thus, at the output of each delay line 20 to 23 the corresponding delayed video signal is passed via a respective resistor R1 to a respective amplifier 24 having a variable feedback resistor R2. By adjusting the resistors R2, when the video signal over the total delay period represents a constant intensity portion of the image, i.e. when all five signals would be equal but for the inherent decrease in amplitude caused by the delay lines, the amplitudes of the four signals $V-1$, $V0$, $V+1$ and $V+2$ can all be made equal to that of $V-2$.

By considering the signal V0 at the mid-point of the series of delay lines as the working video position, the two signals $V+1$ and $V+2$ contain video information which is delayed relative to V0 while the video signals $V-1$ and $V-2$ contain video information which is in advance of that at V0. These signals can be combined in real time to accurately define the position of edges in the video signal. This is achieved as follows.

After passing the signal V0 through an amplifer 25 with a gain of minus one, the five signals $V-2$, $V-1$, $V0$, $V+1$ and $V+2$ are supplied to an inverting amplifer 26 having a feedback resistor R4, each signal being supplied to the amplifier 26 via a respective resistor which is R3 in the case of −V0 and R3' in the case of each of V−2, V−1, V+1 and V+2, where the value of R3'=4 times the value of R3.

This produces a signal D at the output of the amplifier 26 whose amplitude is given by:

$$D = V0 - [(V-2) + (V-1) + (V+1) + (V+2)]/4.$$

This output signal D contains direct information relating to the position of edges in the image, in the direction of line scanning.

In the general case where an even number 2n of delay lines are used, it can be said the signal D represents the difference between n times the amplitude of the video signal at the output of the nth delay line and the sum of the amplitudes of the video signal at the input of the series of delay lines and at the output of each delay line except the nth delay line.

The operation of the circuit of FIG. 2 will be described with reference to FIG. 3, which shows at the top an edge 30 between two contrasting regions 31 and 32, i.e. regions of different intensity as seen by the camera 12. In this case the region 32 is darker than the region 31.

Below that is shown, in solid lines, the amplitude of the video signal V0 corresponding to such edge, from which it will be seen that the video signal does not change abruptly at the edge, but curves with a greater or lesser steepness according to focus and contrast. For example, the dashed line shows the video signal V0 in the case where the edge is less sharply focussed, assuming the same contrast between 31 and 32.

The important thing to notice, however, is that if dA is the change in amplitude of the video signal across the edge, the point P on the downward slope at the half-amplitude position dA/2 will always define the actual edge 30, irrespective of focus and contrast. This is illustrated by the dashed line passing through the same point P.

At the bottom of FIG. 3 there is shown the D derived from the circuit 2 in respect of the video signal V0 shown immediately above. It will be noted that this signal is at zero volts during the constant intensity regions 31 and 32, but in the region of the edge 30 it first rises to a maximum and then falls to a minimum before returning to the zero volt level.

Here the important thing to note is that the point P where the transition between the maximum and minimum intersects the zero volt level coincides with the point P on the video signal V0, again irrespective of focus and contrast.

Naturally, for a video signal representing an edge transition from dark to light (the opposite of that shown), the signals V0 and D shown in FIG. 3 will be symmetrically reversed, but nevertheless the point P defining the edge will still be at the half-amplitude position on V0 and at the intersection of the maximum/minimum transition with zero volts in D.

Thus the output from the edge detector circuit of FIG. 2 will be, for each scan line, a series of maximum/minimum transitions which define all the edges in the direction of the scan line, but which are effectively indiscriminate in that they do not in themselves identify features of interest in the image. In this connection, a feature is regarded as a region of (nominally) constant intensity whose opposite edges are contrasted from their immediate surroundings.

Selection of features of interest is accomplished using the threshold logic shown in FIG. 4, the description of which should be read in conjunction with FIG. 5 which illustrates the various signals appearing at the points shown in FIG. 4.

Referring first to FIG. 5, at the top there is shown the video signal V0, for part of one scan line, for a dark feature against lighter surroundings or background. The video signals V−2, V−1, V+1 and V+2 are also shown. The corresponding signal D, produced by the circuit of FIG. 2, is shown immediately below. The points P define the opposite edges of the feature which it is desired to select. The feature has a width W in the scan line direction.

Referring now also to FIG. 4, the signal D is compared with a reference level of zero volts in a comparator 40, which provides as output a binary signal A having a logic '0' level when the signal D exceeds the reference level, and a logic '1' level when the signal D falls below the reference level. While the reference level applied to the comparator 40 is stated to be zero volts, because D=0 when no edges are present (i.e. constant intensity), in the general case it is possible to superimpose a contstant bias on D so that in such case the reference level would be equal to the constant bias.

At the same time, the video signals V−2, V−1, V+1 and V+2 are each compared in respective comparators 41 with a common adjustable threshold level T which is chosen to intersect the video signal V0 corresponding to the feature to be selected, as shown at the top of FIG. 5. Each comparator 41 provides as output a respective binary signal B having a logic '1' level when the respective video signal falls below the threshold level T, and a logic '0' level when the video signal exceeds the threshold level T. These signals are shown as B1 to B4.

The signals B1 to B4 are ORed in an OR gate 43 to produce the binary signal C1, and they are also ANDed in an AND gate 42 to produce the binary signal C2. The binary signals A and C1 are then ANDed in a further AND gate 44, and finally the binary signal C2 is ORed with the output of the AND gate 44. The result is the binary signal S, shown at the bottom of FIG. 5, which has a logic '1' level defining the feature width W, with a logic '0' level on either side.

Thus, although the signal D in FIGS. 4 and 5 will contain all edges without discrimination, the binary signal S will only contain the opposite edges of features in the image whose video signal V0 falls below the threshold level T. All features whose video signal V0 does not fall below the threshold level T will not appear in the signal S.

It will be recognised that the circuit of FIG. 4 only permits the detection of ALL features for which V0 falls below the chosen threshold level T. Features of intensity intermediate the darkest and the lightest cannot be independently selected since any threshold level T chosen to intersect the video signal for intermediate intensity features will also intersect darker features.

This problem may be solved, if desired, by using a combination of circuits according to FIG. 4, and logically combining their outputs.

FIG. 6 shows, at the top, three features 60 to 62 along a scan line, the feature 60 being darkest, the feature 61 being lightest and the feature 62 having an intermediate intensity, all against a lighter background.

The corresponding video signal V0 and edge detection signal D are shown below, and the output signals S produced by the circuit of FIG. 4 for each of three different threshold levels T1, T2 and T3 are shown as S(T1), S(T2) and S(T3) respectively. Clearly the threshold level T3 will directly select feature 60, and no further processing is necessary.

However, the selection of feature 61, to the exclusion of the others, can only be achieved by EXORing S(T1) and S(T2). Thus, FIG. 7 shows that for this purpose two circuits such as that shown in FIG. 4 are used, one provided with the threshold level T1 and the other with the threshold level T2, and the outputs S(T1) and S(T2) exclusive ORed in a gate 63. The output signal S from gate 63 will contain the feature 61 and no other (except similar intensity features elsewhere on the scan line).

Likewise, feature 62 can be selected by the circuit of FIG. 7 by exclusive ORing S(T2) and S(T3).

In general, therefore, the system will use at least two circuits of the kind shown in FIG. 4 with their outputs logically combined, except in simple cases where intermediate feature detection is not required.

It will be recognised that FIG. 6 represents an idealised situation, since it assumes that the background illumination is constant across the field of view. This will rarely be the case, and if subtle features are to be selected the threshold level T must take account of background variations. The video signals $V-2$, $V-1$, $V0$, $V+1$ and $V+2$ produced from the delay lines 20 to 23 can also be used to remove background shading in a dynamic manner from the image.

FIG. 8 shows an analog circuit wherein the five video signals and a reference signal VR are all connected to the input of an operational amplifier 80 via respective diodes 81 to 86. The reference signal VR is adjustable by a potentiometer connected between the positive side $+V$ of a DC power supply and zero volts. The amplifier 80 has a feedback loop comprising a diode 87 and a resistor R5, and the diode 87 is further connected to the negative side $-V$ of the power supply via a resistor R6. Finally, a parallel RC circuit 88 connects the input of the amplifier 80 to zero volts.

This combination provides a threshold reference which always tracks (follows) the peak amplitude of the most positive going video signal. The effect of this is shown in FIG. 9. The effect of the RC circuit is such that when a feature is encountered threshold reference, rather than following the most positive signal down to the base of the feature, falls only at the rate defined by the time constant of the CR circuit. This effectively holds the threshold reference at a more positive value. Also the reference signal VR can be set that it is just below the minimum excursion of the shading. This will ensure that the tracking threshold reference cannot fall so far on wide features that it hits the bottom of the feature.

It is to be understood that the tracking threshold reference, as generated by the circuit of FIG. 8 and shown in FIG. 9 is not itself used as the threshold level T in FIG. 4. However, the latter may be derived from it using a potentiometer, and a typical threshold level signal T derived from the tracking threshold reference is shown in FIG. 9. It will be seen that, irrespective of the drop in the level T in the feature, it cuts the signal V0 at the desired points X for feature selection. Note that these points X are not the same as the half amplitude points P shown in FIG. 5.

The tracking threshold system so described is able to compensate dynamically for variations in the background viewed by the camera, thereby allowing exact selection of features. When this system is employed with the detection system mentioned earlier capable of finding the exact half amplitude postion of the features, it provides a very accurate and consistent method of feature extraction. The system is therefore capable of removing most artifacts that can effect the direct extraction of features from the viewed image.

FIG. 10 shows in diagrammatic form one type of comparator 17 (FIG. 1) which can be used to compare the signals S supplied by the test and master channels respectively.

The signals S(TEST) and S(MASTER) from the upper and lower channels respectively are supplied to an exclusive OR gate 90. The output of the XOR gate 90 enables a counter 91 to count clock pulses from the timing circuit 18 (FIG. 1). Frame sync signals reset the counter 91, so that at the end of each frame the number held in the counter 91 is a measure of the mismatch in position between features on the test article and corresponding features on the master article.

This is shown in FIG. 11. The field of view of the cameras 12 is represented by the rectangle 93, and the positions of the selected features on the master article by the solid lines 94. The positions of the corresponding features on the test article are shown in broken lines 95, and the hatched areas 96 give the degree of mismatch. The number held in the counter 91 is directly related to the sum of all the hatched areas in FIG. 11.

The number held in the counter 91 at the end of a frame is compared with a tolerance value in a comparator 92, and an error signal is generated if the tolerance value is exceeded. Thus a degree of mismatch is allowed before an article is deemed faulty.

Naturally, the foregoing is but one of many different comparison techniques which could be used, and is merely illustrative of the use to which the invention can be put.

As an alternative to scanning the master article 11 simultaneously with the test article 10, the master article could have been previously scanned, and its signal S stored in an image store 19, FIG. 1. Then, the comparison would be between the real time signal S from the upper test channel with the stored signal S read out from the image store 19. To ensure that equivalent image portions are being compared, the read out from the store 19 would be synchronised from the timing circuit 18. Techniques for storing and reading out digital image information in this way are well known.

As mentioned previously, although FIG. 2 uses four video delay lines 20 to 23 with delays of 500 ns, 200 ns, 200 ns and 500 ns respectively, the invention is not thus limited, either in the number of delay lines or their delay times.

Any even number 2n of delay lines can be used, with n being greater than or equal to one. However, the individual delays must be symmetric relative to the mid-point of the series. In other words, the outermost two delay lines must provide the same delay, the next two delay lines inwardly towards the mid-point of the series must provide the same delay, and so on.

Re-stated, the delay provided by the mth delay line, where m is greater than or equal to one and less than or equal to n, must be equal to the delay provided by the (2n-m+1)th delay line. It is preferable if the delay times increase outwardly from the mid-point of the series, as described for the four delay line embodiment shown in FIG. 2. In particular, no delay line should have a delay time less than the delay time of the two delay lines immediately on either side of the mid-point of the series.

The overall delay provided by the series of delay lines should not be so great that the delay can embrace two edges at a time, and should not be so short as to be less than the fall time of the video signal at an edge. In any particular case, experiment will determine the best individual and overall delay times.

It is to be understood that although the invention has been decribed in the context of an inspection system wherein a test article is compared against a master article, the techniques of edge detection described with reference to FIGS. 2 and 3, and the selection technique described with reference to FIGS. 4 to 7, are useful in general in image processing applications.

I claim:

1. An image processing system comprising means for line-by-line scanning an article to generate a video signal representing an image of the article, a plurality 2n of series-connected delay means where n is greater than or equal to one and the time delays of the delay means are substantially symmetrical relative to the mid-point of the series, an input for the video signal at one end of the series of delay means, means for normalizing the amplitudes of the underlayed and successively delayed video signal whereby all such amplitudes are equal when the video signal over the total delay period represents a constant intensity portion of the image, and means for forming a signal D representing the difference between n times the amplitude of the video signal at the mid-point of the series of delay means and the sum of the amplitudes of the video signal at the input of the series of delay means and at the output of each delay means except the delay means whose output is at the mid-point of the series, such signal D defining the positions, in the direction of line scanning, of edges between contrasting region of the image.

2. A system according to claim 1, further comprising threshold logic means for forming from the signal D a binary signal S in which at least one selected image feature, as defined by the positions of its opposite edges in the signal D, is represented by a first logic level and the portions of the image on either side of such feature are represented by a second logic level.

3. A system according to claim 2, wherein the threshold logic means comprises means for comparing the binary signal D with a reference level, equal to the level of the signal D when the video signal over the total delay period represents a constant intensity portion of the image, to generate a binary signal A having a first logic level when the signal D exceeds the reference level and a second logic level when the signal D does not exceed the reference level, means for comparing the amplitude of the video signal at the input of the series of delay means and the amplitudes of the video signal at the output of each delay means except the delay means whose output is at the mid-point of the series each with a common threshold level to generate in each case a respective binary signal B having a first logic level when the video signal exceeds the threshold level and a second logic level when the video signal does not exceed the threshold level, and logic gating means effecting a logical combination of the binary signal A and the binary signals B to derive the binary signal S.

4. A system according to claim 3, wherein the gating means comprises a first gate for ORing the binary signals B, a second gate for ANDing the binary signals B, a third gate for ANDing the binary signal A with the output of the first gate, and a fourth gate for ORing the outputs of the second and third gates, the binary signal S appearing at the output of the fourth gate.

5. A system according to claim 3, further comprising means causing the threshold level to track the maximum amplitude of the undelayed and delayed video signal.

6. A system according to claim 1 for comparing the said article as an article under test with a master article known to be acceptable, the system further comprising comparison means for comparing each line of the signal S in synchronism with the corresponding line of a similar signal S derived from an image of the master article and for generating an error signal when a predetermined comparison criterion is not met.

7. A system according to claim 6, wherein the comparison means comprises means for exclusive ORing the binary signals S relating to the article under test and to the master article.

8. A system according to claim 6, further including means for line-by-line scanning the master article in synchronism with the scanning of the article under test to generate an analog video signal representing an image of the master article, and means for deriving a signal S in respect of such video signal, the signal S corresponding to the master article being compared by the said comparison means with the signal S corresponding to the article under test.

9. A system according to claim 6, further including an image store for containing a signal S derived by previously scanning an image of the master article, the signal S in the image store being read out in synchronism with the signal S corresponding to the article under test for comparison by the said comparison means.

10. A system according to claim 1, wherein the scanning mean comprises a television-type camera.

* * * * *